Patented Aug. 8, 1944

2,355,330

UNITED STATES PATENT OFFICE 2,355,330

ALLYL AND METHALLYL ESTERS OF ALPHA-HYDROXY-ISOBUTYRIC AND ALPHA-ACETOXY-ISOBUTYRIC ACIDS

Chessie E. Rehberg, Philadelphia, and Charles H. Fisher, Abington, Pa., assignors to Claude R. Wickard, as Secretary of Agriculture of the United States of America, and his successors in office No Drawing. Application February 4, 1943, Serial No. 474,758

4 Claims. (Cl. 260—484)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

Our invention relates to new and useful allyl and methallyl esters of alpha-hydroxy-isobutyric and alpha-acetoxy-isobutyric acids, namely, allyl alpha-hydroxy-isobutyrate, beta-methylallyl alpha-hydroxy-isobutyrate (hereinafter referred to as "methallyl alpha-hydroxy-isobutyrate"), allyl alpha-acetoxy-isobutyrate and beta-methylallyl alpha-acetoxy-isobutyrate (hereinafter referred to as "methallyl alpha-acetoxy-isobutyrate"), having the formulae:

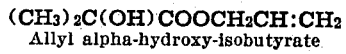
Allyl alpha-hydroxy-isobutyrate

Methallyl alpha-hydroxy-isobutyrate

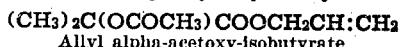
Allyl alpha-acetoxy-isobutyrate

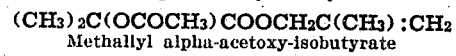
Methallyl alpha-acetoxy-isobutyrate

The object of our invention is the production of compounds that are useful as solvents, plasticizers, chemical intermediates and as starting materials in the production of allyl methacrylate and methallyl methacrylate which are substances polymerizable into plastic, semi-solid or solid materials useful in industry because of their tensile strength, elasticity, plasticity, resistance to water, organic liquids and gases, and because of other desirable properties.

It is well known (Burns, Jones and Ritchie, J. Chem. Soc., 1935, 400–06, 714–17; Claborn, U. S. 2,222,363, November 19, 1940; Claborn, U. S. 2,229,997, January 28, 1941; Smith, Fisher, Ratchford and Fein, Ind. Eng. Chem. 34, 473–79 (1942)) that the methyl esters of alpha-acetoxy aliphatic carboxylic acids can be decomposed thermally to yield as the principal products the methyl esters of the corresponding acrylic or substituted acrylic acids, which esters can be converted by polymerization into substances useful in the plastics and related industries. However, the esters of these acetoxy aliphatic acids prepared from the aliphatic alcohols of higher molecular weight have been observed to be unsuitable for production of the corresponding acrylates because of the preponderance of undesirable reactions.

We have found that the undesirable reactions are decreased when the ester is one prepared from an alcohol which has an olefinic linkage between the beta and the gamma carbon atoms, and that, owing to the characteristics of the allyl and substituted allyl radicals and their esters, the allyl and substituted allyl alpha-acetoxy esters can be converted readily and in good yields into allyl and substituted allyl acrylates and substituted acrylates (as shown below) which can be polymerized and interpolymerized into materials useful in industry.

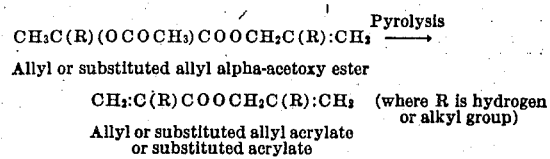

Thus we have found that allyl alpha-hydroxy-isobutyrate, methallyl alpha-hydroxy-isobutyrate, allyl alpha-acetoxy-isobutyrate and methallyl alpha-acetoxy-isobutyrate are new and useful compounds which are solvents and plasticizers, and which are readily convertible into the corresponding alpha-methylacrylates and polymers and interpolymers thereof.

Allyl and methallyl alpha-hydroxy-isobutyrates can be made by the interaction of allyl and methallyl alcohols, respectively, and alpha-hydroxy-isobutyric acid, or by any other suitable method, such as interaction of allyl halides and alkali metal salts of hydroxy-isobutyric acid. Allyl and methallyl alpha-acetoxy-isobutyrates can be prepared from allyl and methallyl alpha-hydroxy-isobutyrates, respectively, by acetylation with acetic anhydride, ketene, or any other suitable acetylating agent.

*Example I.*—104 grams (1 mole) of alpha-hydroxy-isobutyric acid, 174 grams (3 moles) allyl alcohol and 100 cc. of benzene were refluxed under a fractionating column which carried a Betz-Holden type water trap and a reflux condenser at its top. A total of 10.5 cc. of water was removed through the trap. Fractionation of the mixture yielded 67.5 g. of crude ester boiling at 83–90° C. under 40 mm. of mercury pressure. The recovered allyl alcohol, together with 1 g. of p-toluenesulfonic acid, was returned to the flask containing the acid residue and the mixture was refluxed for several hours. Fractionation of this mixture yielded an additional 26.5 g. of ester. The total yield was thus 94 g., or 64.5 percent of the theoretical.

Allyl alpha-hydroxy-isobutyrate is a clear, colorless, mobile liquid, with a mild, pleasant odor. It boils at 86° C. under 40 mm. of mercury pressure, has an index of refraction at 20° C. for the yellow sodium line of 1.4308 and a density at 20° C. of 1.0010 g. per cc.

*Example II.*—Using essentially the procedure of Example I, there was obtained from 208 grams (2 moles) of alpha-hydroxy-isobutyric acid and 432 grams (6 moles) of beta methallyl alcohol, a yield of 220 g. of methallyl alpha-hydroxy-isobutyrate, this being 70 percent of the theoretical.

Methallyl alpha-hydroxy-isobutyrate is a clear, colorless, mobile liquid with a pleasant odor. It boils at 78° C. under 16 mm. of mercury pressure and at 20° C. it has a refractive index for the yellow sodium line of 1.4334 and a density of 0.9760 g. per cc.

*Example III.*—Through a dropping funnel 161.3 grams (1.58 moles) of acetic anhydride was slowly added, with stirring, to 190 grams (1.32 moles) of allyl alpha-hydroxy-isobutyrate containing 2 cc. of phosphoric acid and which was maintained at 80–110° C. After the addition was completed, the mixture was heated to 100–110° C. for 30 minutes, after which 5 g. of sodium acetate was added and the mixture fractionated. In this manner 217 g. of allyl alpha-acetoxy-isobutyrate was obtained, this yield being 88 percent of the theoretical.

Allyl alpha-acetoxy-isobutyrate is a clear, colorless, mobile liquid with a faint, pleasant odor. It boils at 96° C. under 19 mm. of mercury pressure and at 20° C. it has a density of 1.0332 g. per cc. and a refractive index for the yellow sodium line of 1.4280.

*Example IV.*—Using essentially the procedure described in Example III, 161.2 grams (1.02 moles) of methallyl alpha-hydroxy-isobutyrate was acetylated by treatment with 116.4 grams (1.14 moles) of acetic anhydride, thereby producing 140 grams (0.70 moles) of methallyl alpha-acetoxy-isobutyrate, or a yield of 68 percent of the theoretical.

Methallyl alpha-acetoxy-isobutyrate is a clear, colorless, mobile liquid with a pleasant odor. It boils at 106° C. under 19 mm. of mercury pressure and at 20° C. it has a density of 1.0126 g. per cc. and a refractive index for the yellow sodium line of 1.4321.

Having thus described our invention, we claim:

1. A composition of matter comprising allyl alpha-hydroxy-isobutyrate represented by the formula $(CH_3)_2C(OH)COOCH_2CH:CH_2$.

2. A composition of matter comprising beta-methylallyl alpha-hydroxy-isobutyrate represented by the formula $$(CH_3)_2C(OH)COOCH_2C(CH_3):CH_2$$

3. A composition of matter comprising allyl alpha-acetoxy-isobutyrate represented by the formula $(CH_3)_2C(OCOCH_3)COOCH_2CH:CH_2$.

4. A composition of matter comprising beta-methylallyl alpha-acetoxy-isobutyrate represented by the formula $$(CH_3)_2C(OCOCH_3)COOCH_2C(CH_3):CH_2$$

CHESSIE E. REHBERG.
CHARLES H. FISHER.